United States Patent [19]

Suminsby

[11] 4,112,754
[45] Sep. 12, 1978

[54] PENDULOUS INDUCTION COMPASS TRANSMITTER INCLUDING MEANS EXTERNAL TO THE TRANSMITTER TO COMPENSATE FOR HEADING ERRORS IN TURNS DUE TO THE VERTICAL COMPONENT OF THE EARTH'S MAGNETIC FIELD AND DUE TO TWO CYCLE ERROR

[76] Inventor: John Suminsby, 65 Arbor St., Wenham, Mass. 01984

[21] Appl. No.: 752,278

[22] Filed: Dec. 20, 1976

[51] Int. Cl.² ............................................. G01C 21/00
[52] U.S. Cl. .................................. 73/178 R; 33/356; 318/633
[58] Field of Search ................. 33/326, 356, 357, 361; 73/178 R; 235/150.25, 150.26, 186; 244/175, 179; 318/629, 633, 647, 654, 661; 340/197, 347 SY; 324/43 R, 47

[56] References Cited

U.S. PATENT DOCUMENTS

| | | | |
|---|---|---|---|
| 3,244,961 | 4/1966 | Adler | 318/629 X |
| 3,628,254 | 12/1971 | Burmeister | 33/357 |
| 3,678,593 | 7/1972 | Baker et al. | 33/361 |
| 3,939,572 | 2/1976 | Erspamer | 33/361 |
| 4,006,631 | 2/1977 | Garner | 33/356 X |

*Primary Examiner*—Stephen G. Kunin

[57] ABSTRACT

The invention relates to an apparatus for compensating the output signals from a pendulous induction compass transmitter to eliminate heading errors during turns due to the vertical component of the Earth's magnetic field as well as those due to the horizontal component of the Earth's magnetic field perpendicular to the axis of tilt, i.e., two cycle error. By compensating for the effect of Earth's vertical field component, instabilities and anomalies such as "Northerly Turning Error" are eliminated or minimized. Compensation for vertical field error is achieved by generating a signal proportional to the product of the Earth's magnetic field M, the sine of the magnetic dip angle D at the given latitude and longitude and the sine of the aircraft bank or roll angle $\phi$. This signal is combined (by summation) with the demodulated signal from the sin $\psi$ channel (i.e., the signal from the windings of the compass transmitter which senses the field along the athwartships axis) to cancel vertical error. Similarly, a signal proportional to the cosine of the aircraft bank or roll angle $\phi$ is generated and combined with the corrected DC signal from the compass transmitter to cancel two cycle error. Since the magnitude of the bank angle $\phi$ or its trigonometric functions, i.e., sin $\phi$ and cos $\phi$, can readily be obtained from the aircraft vertical gyroscope and the dip angle D is known for any latitude and longitude, these two compensating signals can easily be generated and applied to the output signal processing channels from the compass transmitter to cancel the effects of vertical field error and two cycle error during a turn.

5 Claims, 5 Drawing Figures

PENDULOUS INDUCTION COMPASS TRANSMITTER INCLUDING MEANS EXTERNAL TO THE TRANSMITTER TO COMPENSATE FOR HEADING ERRORS IN TURNS DUE TO THE VERTICAL COMPONENT OF THE EARTH'S MAGNETIC FIELD AND DUE TO TWO CYCLE ERROR

Specification

The instant invention relates to a magnetic heading reference system and more particularly, to one utilizing an induction compass transmitter which is compensated in the signal processing channel external to the transmitter to minimize or eliminate heading errors during during turns.

Normally, the heading output from aircraft compass systems is obtained from a directional gyro whose heading is slowly corrected to agree with the heading provided by an induction compass transmitter. This type of directional and heading output system is complementary in that the short term stability and accuracy of the gyroscope is combined with the long term accuracy of the compass transmitter so that the overall system incorporates the best features of each. One class of compass transmitters used as aircraft magnetic heading references are pendulous in order to assure that the sensing elements (magnetometer windings) remain horizontal during non-accelerating straight flight within the pendulous tilt freedom of the device (which may normally be in the range of ± 27°). Under these conditions, the induction compass properly senses the horizontal component of the Earth's magnetic field and is insensitive to the vertical component of the Earth's field. The horizontal component, H, of the Earth's magnetic field M can be resolved along the aircraft fore and aft (roll) the athwartships (pitch) axes so that the heading indicated by the compass transmitter is represented by the arc tangent of the athwartships component $H_p$ of the Earth's magnetic field divided by the fore/aft component $H_R$, as sensed in plane of the sensing elements.

However, because of the pendulous suspension, the compass transmitter is susceptible to tilt during turns and during linear acceleration. This, in turn, produces errors in the sensed direction of the magnetic north and in indicated heading. That is, any acceleration due to speed changes, or the centripetal acceleration imposed during a turn, causes the plane of the sensing elements of the compass transmitter to be displaced from the horizontal. Thus, in the case of a coordinated turn, the pendulous element assumes a lateral tilt angle which agrees with the bank angle of the aircraft. Because of this tilting of the plane of the compass transmitter, not only is the sensed horizontal component normally reduced, but, in addition, a component of the Earth's vertical field is sensed. This sensed vertical component adds vectorially to the sensed Earth's horizontal field component and, in the general case, results in an erroneous sensing of magnetic North.

This tilt of the compass transmitter sensing element produces errors from the combination of two causes:

One of these errors is a two cycle error which is developed whenever there is a component of the Earth's horizontal magnetic field perpendicular to the axis of tilt together with a component along the axis of tilt. The perpendicular component is reduced in magnitude by a function of the angle of tilt when projected onto the plane of the sensing coil. This reduced component when recombined with the unchanged horizontal component along the axis of tilt produces an apparent vectorial shift in the sensed direction of the field in the plane of the sensing winding. The two cycle error is thus a function of both the heading angle and the angle of tilt. It has the same magnitude for all magnetic field dip angles D and is normally small.

The other tilt induced error occurs because the vertical component of the Earth'magnetic field projects onto the plane of the tilted winding and vectorially adds to the sensed horizontal component. This vertical field error, however, varies with magnetic field dip angle D, and as a result, can vary widely. Tilt about the aircraft roll axis during turns causes this second error source to produce what is termed "Northerly Turning Error" and can induce heading anomalies and ambiguities as well as a continuous oscillation when attempting to straighten out on a northerly heading when in the Northern Hemisphere, and similarly, when attempting to straighten out on a southerly heading in the Southern Hemisphere. The nature of this error which is due to the vertical component of the Earth's magnetic field may be more clearly understood by considering the following:

Assume that an aircraft is using a pendulous induction compass transmitter as a heading reference in a coordinated right turn and attempts to level out on a North heading. The pendulous transmitter tilts with the same right wing down bank attitude as the aircraft itself. When on a North heading, a portion of the Earth'vertical field vector now passes West to East in the plane of the compass transmitter vectorially adding to the actual sensed horizontal component and making it appear that North is to the East of its actual location. Consequently, the aircraft continues to turn beyond North before levelling off. Once level, North is correctly indicated to the West, and the aircraft must go into a left bank for heading correction. A portion of the Earth's vertical field vector now passes from East to West in the plane of the transmitter, and is added vectorially to the actual horizontal component in an opposite sense thereby making it appear that North is to the West of its actual direction. Again, the aircraft continues to turn beyond North before levelling off. This situation continues to repeat making it virtually impossible to obtain or maintain the desired constant North heading.

It is therefore customary in existing slaved aircraft compass systems, to disconnect compass slaving during turns in order to avoid this oscillating condition about the northerly heading. This vertical field error also often causes the aircraft compass mode of operation (available on some compass systems for emergency use when the directional gyro fails) to become literally useless during turns unless dip angle is relatively small. Since the dip angle in the middle of the Continental U.S. is approximtely 70°, it can be seen that this is a serious problem in aircraft navigation.

In a recently filed application entitled "Pendulous Induction Compass Transmitter with Means to Compensate for Heading Errors in Turns Due to the Vertical Component of the Earth's Magnetic Field, Ser. No. 729,135 Filed: Oct. 4, 1976 in the name of Gerald L. Sullian, and assigned to the General Electric Company, the assignee of the present invention, a compensating system for a compass transmitter is described in which a DC compensating signal equal to the product of the sine of the known magnetic field dip angle D, the sine of the tilt or bank angle $\phi$ and the Earth's magnetic field M is generated and utilized to drive a current through the sensing windings of the compass transmitter or through auxiliary winding to generate a flux field which cancels the flux sensed during a turn due to the Earth's vertical field component. The output from the induction compass during a turn is thus essentially free of errors due to the vertical component of the Earth's magnetic field, thereby minimizing or eliminating the hemispherical turn errors of the type usually referred to as "Northerly Turning Errors." This, in turn, makes it possible to use the magnetic compass for heading or control purposes without the need for a directional gyroscope.

While the arrangement shown in the aforesaid Sullivan application is very effective in compensating a pendulous compass transmitter for errors due to the component of the vertical component of the Earth's magnetic field, there may, in certain limited circumstances, be some practical problems associated therewith. By applying the compensation current directly to the sensing windings or to a separate compensating winding, blocking capacitors must be used between the compass transmitter and the heading indicator or control system to which the induction compass transmitter is coupled. Furthermore, there is also a need for maintaining a high impedance source for the compensation signal generating network in order to void scale errors due to loading. The instant invention is based on the recognition that compensation both for vertical field errors and two cycle errors can be achieved by adding the DC compensation signal in the signal processing channel for the field sensed along the athwartships axis of the aircraft. By combining the DC compensating signal with the demodulated (i.e., DC) signal, the effects of vertical field error and two cycle error can easily be cancelled. This arrangement avoids the problems associated with direct injection of currents into the compass, transmitter sensing windings or associated auxiliary compensating windings.

It is therefore a princpal objective of the invention to provide an arrangement for compensating a pendulous induction compass transmitter to eliminate heading errors in turn caused by vertical field error by compensating the demodulated signal from the transmitter in a signal processing channel outside of the transmitter.

A further objective of the instant invention is to provide a compensated, pendulous induction compass transmitter in which heading errors due to turn induced tilting of the sensing elements are minimized or reduced entirely.

Yet another objective of the invention is to provide an arrangement for compensating a pendulous compass transmitter to eliminate heading errors in turns due to two cycle error by compensating the demodulated output signal from the compass to the transmitter.

Still another objective of the invention is to provide a compensated, pendulous induction compass transmitter in which turn induced heading errors caused by the vertical component of the Earth's magnetic field or by two cycle error are cancelled external to the transmitter.

Other objectives and advantages of the instant invention will become apparent as the description thereof proceeds.

In accordance with one aspect of the invention, a compensating signal is generated and is used to cancel the vertical field error in the demodulated output signal from athwartships sensing winding of a pendulously mounted compass transmitter. The compensating signal is obtained without having to sense the vertical field directly, but is derived from the Earth's magnetic field M (a known quantity), the magnetic dip angle D (a known quantity for any given latitude or longitude) and the tilt angle (i.e., bank or roll angle $\phi$ for a pendulous transmitter) which is a sensed quantity readily obtainable from the aircraft vertical gyroscope. The compensating signal is a DC signal which has a magnitude equal to $M \sin D \sin \phi$ which by definition is equal to the vertical field error $V \sin \phi$. This DC compensating signal is combined with the demodulated signal from those windings of the compass transmitter which sense the Earth's magnetic field along the athwartships axis of the aircraft. In this fashion, errors introduced during aircraft turns due to the vertical component of the Earth's field are eliminated, as are the heading instabilities which manifest themselves as "Northerly Turning Errors." The compensated, demodulated DC compass transmitter signal may then be remodulated or otherwide processed to provide the suitable signals for use in a heading, indicating, or control system.

In an alternative embodiment, the compensated demodulated signal may also be processed to compensate for two cycle error by introducing a DC signal proportional to the cosine of the roll angle $\phi$ and by combining it, as by multiplying it in a negative feedback network with the signal compensated for vertical field error. The twice compensated signal is free of vertical field error and two cycle error.

The novel features which are characteristic of this invention are set forth with particularity in the appended claims. The invention itself, however, both as to its organization and mode of operation, together with further objectives and advantages thereof, may best be understood by reference to the following description taken in connection with the accompanying drawings in which:

Figure 1:
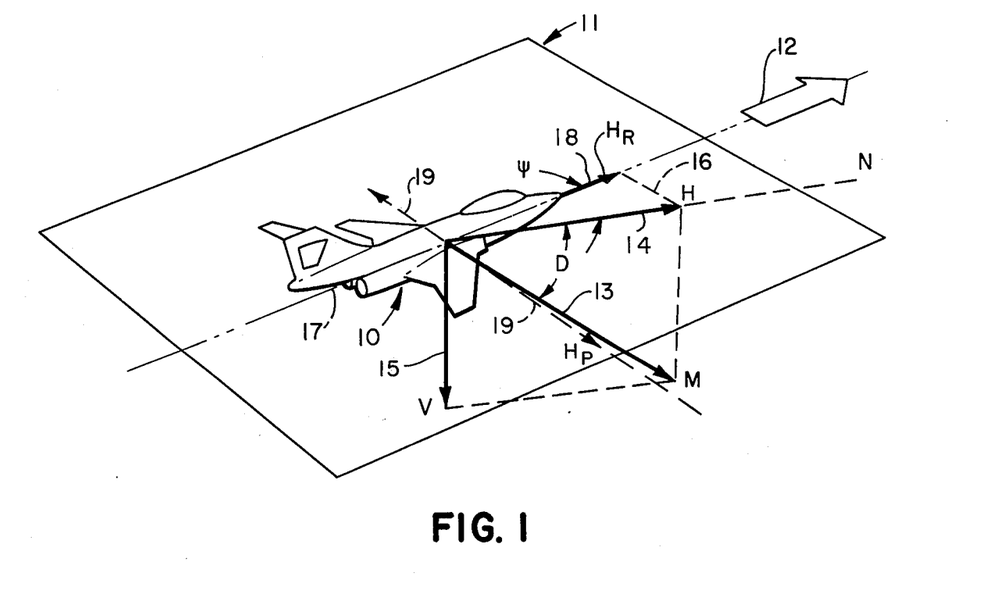
FIG. 1 is a perspective depiction of an aircraft during level flight in the horizontal plane and shows the basic relationship between the Earth's magnetic field M, magnetic dip angle D, and the aircraft axes.

In order to understand the manner in which the instant invention is utilized to compensate a pendulous induction compass transmitter to reduce or eliminate heading errors caused by the vertical component of the Earth's magnetic vield, it will be useful to discuss initially the relationship between the Earth's magnetic field and the magnetic field components sensed by an induction compass transmitter both in level flight and during a turn when tilting of the aircraft axis and of the compass transmitter produces changes in the sensed field. Thus, FIG. 1 illustrates an aircraft 10 in level flight in the horizontal plane (illustrated generally at 11) in a direction shown by the arrow 12 which in the particular instance is shown to be a westerly heading with respect to magnetic north N. The heading indicated by a pendulous induction compass transmitter under non-accelerating straight flight, for all pitch angles within the degree of freedom of tilt for the particular transmitter represents the direction of the aircraft with respect to the north directed horizontal component H of the Earth's magnetic field M. The Earth's magnetic field M is a vector quantity shown at 13 consisting of a north directed horizontal component H shown at 14 and a vertical component V shown at 15. The angle measured from the horizontal component H to the Earth's magnetic field vector M is termed the dip angle D with the dip angle being considered positive when the Earth's magnetic field dips below the horizontal as it does in the Northern Hemisphere. Consequently, the vertical component V of the Earth's field is considered positive when directed downward. The direction of the Earth's magnetic field, i.e., the dip angle D varies with latitude with the dip angle being zero (0°) at the magnetic equator and becoming 90° at the North magnetic pole. The analytical relationship between the Earth's magnetic field and the horizontal and vertical components are therefore as follows:

$H = M \cos D$; (1)
$V = M \sin D$; (2)
$\tan D = V/H$; (3)

Aircraft magnetic heading is defined as the horizontal angle $\psi$ (positive in a clockwise direction from North) shown generally at 16 between the horizontal projection of the aircraft fore/aft or roll axis, shown at 17 and magnetic North. The horizontal component H of the Earth's magnetic field may in turn be resolved along the aircraft axes into two orthogonal horizontal components $H_R$ and $H_p$ which are a function of magnetic heading angle $\psi$. $H_R$ is a component parallel to the horizontal projection 17 of the aircraft fore/aft or roll axis and is shown generally by the dashed arrow 18 and is considered positive when directed forward. $H_p$ is a component parallel to the horizontal projection of the aircraft athwartships or pitch axis shown by the arrow 19. $H_p$ is considered positive when directed to port as shown by the dashed arrows. With the western heading shown in FIG. 1, the sensed athwartships component is directed to starboard and is therefore considered to be negative. The analytical relationships between the orthogonal horizontal field components $H_p$ and $H_R$ along the aircraft axes, the heading angle $\psi$ and the horizontal projection of the Earth's magnetic field H may be defined as follows:

$\psi$ = actual magnetic heading
$H_p = H \sin \psi$; (4)
$H_R = H \cos \psi$; (5)
$\tan \psi = (H_p/H_R)$; (6)

The heading indicated by an induction compass transmitter may be generally represented by the arc tangent of the athwartships (positive to port) component A of the Earth's magnetic field divided by the fore/aft (positive forward) component F of the Earth's magnetic field as sensed in the plane of the compass transmitter windings. When the aircraft is in level flight in the horizontal plane as shown in FIG. 1, the two orthogonal components of the horizontal field H are sensed accurately and produce an accurate magnetic heading indication. It can also be appreciated that with the aircraft in level flight, the vertical component V is at right angles to the sensing windings as illustrated at 15, of the compass transmitter and is not sensed. Consequently, vertical field component 15 has no effect on the indicated magnetic heading.

Figure 2:
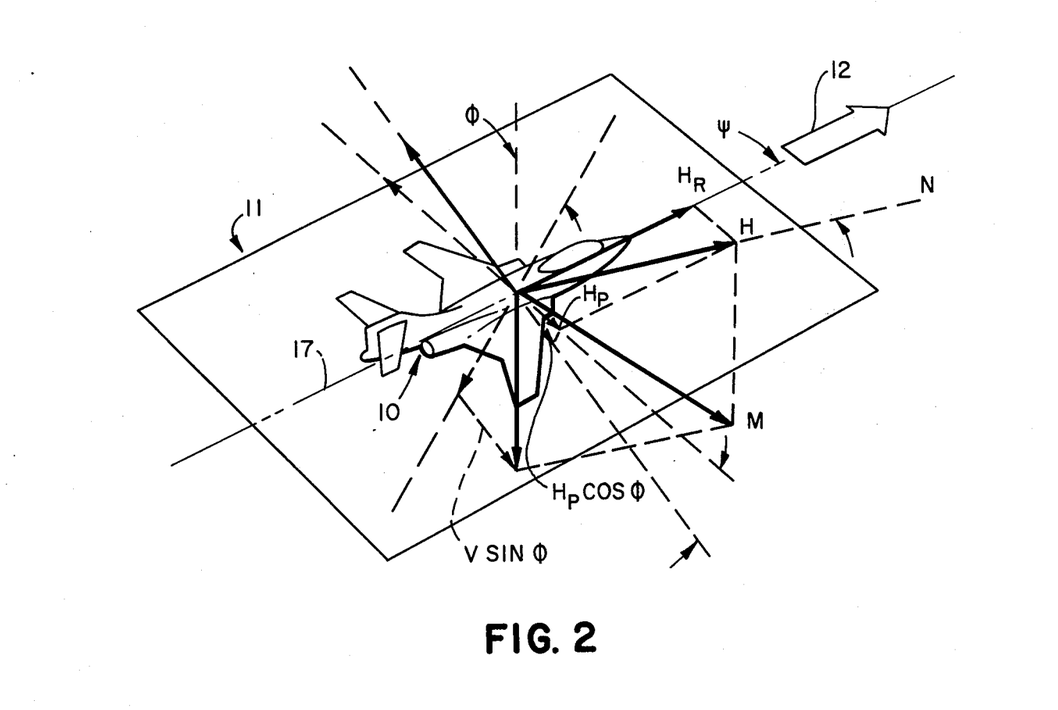
FIG. 2 is a perspective depiction of the aircraft during a coordinated turn showing the effect of the turn and the relationship of the magnetic field components sensed by the compass transmitter, the aircraft axes, and the Earth's magnetic field.

FIG. 2 illustrates the effect on the sensed magnetic field components as the aircraft goes into a level turn, i.e., the aircraft is making a coordinated turn without either diving or climbing. Thus, aircraft 10 is shown as having rotated about roll axis 17 through a positive bank angle $\phi$ initiating a right turn away from its previous heading shown by arrow 12 and toward magnetic North. With an aircraft bank angle $\phi$ the transmitter is tilted through angle $\phi$ and the windings which sense the athwartships component A now sense a horizontal component which is reduced in magnitude by the cosine of the bank angle $\phi$. The athwartships component $A_{\phi H}$ due to the Earth's horizontal field component is now:

$$A_{\phi H} = H_p \cos \phi \qquad (7)$$

The horizontal component $H_R$ sensed along the fore-/aft axis remains the same (i.e., a function of the sine of the heading angle $\psi$ since the turn is a level turn so that the pitch angle $\phi = 0$.

With the transmitter tilted to the aircraft bank angle $\phi$, the vertical component V or Earth's field is no longer perpendicular to the plane of the athwartships sensing windings and a component of the vertical field V is sensed along the aircraft athwartships axis and is proportional to the product of V and the sine of bank angle $\phi$. As shown in FIG. 2, for right wing down bank (i.e., $\phi$ is positive) this component, $A_{\phi V}$, is directed along the starboard axis and therefore is considered to be negative. It will be understood that for a left wing down bank (i.e., $\phi$ is negative) the vertical field component is directed to port and therefore will be positive. Thus, $A_{\phi V} = -V \sin \phi$. The total athwartships component $A_\phi$ sensed in the tilted plane of the compass transmitter for bank or tilt $\phi$ is therefore defined as follows:

$$A_\phi = A_{\phi H} + A_{\phi V} = H_p \cos \phi - V \sin \phi \qquad (8)$$

$$A_\phi = H \sin \psi \cos \phi - V \sin \phi \qquad (9)$$

The fore/aft component sensed by the transmitter is not affected by the vertical component of the Earth's field in a level turn.

$$F_\phi = H_R = H \cos \psi \qquad (10)$$

The subscript $\phi$ is used to represent bank tilt only.

As pointed out previously, the tangent of the indicated flux valve heading $\psi_\phi$ then becomes:

$$\tan \psi_\phi = \frac{A_\phi}{F_\phi} = \frac{H \sin \psi \cos \phi - V \sin \phi}{H \cos \psi} \qquad (11)$$

$$\tan \psi_\phi = \tan \psi \cos \phi - \frac{V \sin \phi}{H \cos \psi} \qquad (12)$$

Substituting Equation (3) into Equation (12) the indicated flux valve heading then becomes:

$$\tan \psi_\phi = \tan \psi \cos \phi - \frac{\tan D \sin \phi}{\cos \psi} \qquad (13)$$

The first expression $\tan \psi \cos \phi$ on the right hand side of Equation (13) contains the two cycle error in that it is a function both of the heading angle $\psi$ and the bank angle $\phi$. The second expression on the right hand side represents the vertical field error and it is a function of the dip angle D; i.e., $$\text{i.e., vertical field error} = -\tan D \frac{\sin \phi}{\cos \psi} \quad (14)$$

Since dip angle varies with latitude from 0° at the equator to 90° at the magnetic North pole, the vertical field error can vary substantially and produce turning problems.

These problems can be generally divided into two different but similar categories. One set of problems occur if the bank angle equals or exceeds a critical angle, namely the complement of the magnetic dip angle. In such an instance, it is not possible to find and indicate all headings inasmuch as the compass transmitter only indicates a limited range of headings no matter what the actual heading is. Even if the bank angle is less than the critical angle, the vertical field error causes oscillations about the desired heading when attempting to straighten out to a more northerly heading or to a direct North heading.

For bank angles equal to or greater than the critical angle, the problem is most severe when an aircraft is on direct East (90°) or West (270°) heading and tries to turn to another heading. In an East or West heading the sensed fore/aft component F of the horizontal field obviously goes to zero. The sensed athwartships component A can, with certain bank and dip angles, be so affected by vertical field errors as to cancel the Earth's North directed horizontal field component so that the induction compass transmitter temporarily is incapable of sensing and indicating any magnetic heading angle. As a result, the aircraft will not be able to turn toward a specific heading. That is, the sensed vertical field component equal and opposite to the component of the Earth's horizontal magnetic field component sensed along the athwartships axis. Consequently, the North directed horizontal magnetic field component seems to disappear resulting in a complete loss of magnetic heading. As pointed out above, for direct East and West headings, the fore/aft component $F_\phi = 0$. Under these circumstances, the value of the sine of the heading angle $\psi$, East $-\psi = 90° = \sin 90° = +1$ and for (West $-\psi = 270°$) $\sin \psi = \sin 270° = -1$. Thus, for an East heading the athwartships component A as defined in Equation (9) becomes zero resulting in a loss of heading when the vertical field error $V \sin \phi = H \sin \psi \cos \phi$. Since for an East (90°) heading $\sin \psi = +1$, this occurs when:

$$V \sin \phi = H \cos \phi \quad (15)$$

Transposing, Equation (15) becomes $$\frac{H}{V} = \frac{\sin \phi}{\cos \phi} \quad (16)$$

By trigonometric transformation, Equation (16) becomes:

$$\frac{H}{V} = \tan \phi. \text{ But,} \quad (17)$$

$$\frac{H}{V} = \cot D,$$

so Cot D = Tan $\phi$. But Cot D = Tan (90° − D).

Therefore, Tan $\phi$ = Tan (90° − D)  (18)

or $\phi = 90° - D$  (19)

In other words, for a given dip angle D, the compass transmitter heading becomes intermediate in the Northern Hemisphere on an East heading when the angle of bank is right wing down and equal to the complement of the dip angle. Obviously, if $\phi > 90 - D$ then the indicated heading actually reverses 180°.

Similarly, for a West heading with sin $\psi = -1$, $$\tan \phi - \frac{H}{V} = -\cot D = -\tan (90° - D) = \quad (20)$$

$$\tan -(90° - D) \text{ or } \phi = -(90° - d)$$

In summary, indicated headings become intermediate in the northern hemisphere when flying East with a right wing down (positive) bank angle equal to the complement of the dip angle or when flying West with a left wing down (negative) bank angle equal to the complement of the dip angle. Further increasing the bank angle results in a reversal of the polarity of the athwartships component $A_\phi$ and produces 180° error in indicated heading for the above conditions. Consequently, the indicating heading appears to modulate around West (270°) during a right wing down turn, and to modulate around East (90°) during a left wing down turn. This results in not being able to turn to indicated headings near East or West without first levelling down to a bank angle which is lower than the complement of the dip angle. For the Mideastern U.S., where dip angle is +70°, the bank angles must therefore be less than ± 20° to avoid this problem on the East/West heading.

In addition to the problems encountered in turns when on an East/West heading the so-called "Northerly Turning Error" induces continuous oscillations when attempting to straighten out on a northerly heading when in the Northern Hemisphere even though the bank angle is less than the complement of the dip angle. Although the errors are normally called "Northerly Turning Error," it will be appreciated that it is a hemispherical turning error and that the same problem exists in the Southern Hemisphere when turning to a southerly heading.

For headings other than East (90°) and West (270°) in which bank angle equals or exceeds the complement of the dip angle, an induction compass transmitter indicates only a limited and erroneous range of headings.

The nature of the problem may be discerned from Tables I and II which tabulate indicated heading vis-a-vis the actual heading in case of Table I and magnitude and sign of the error in Table II for bank angles of ± 15° which are less than critical) and ± 30°, and dip angle of D = +70°, which represents a dip angle typical of the Eastern United States.

TABLE I

| Actual Hdg (°) | INDICATED HEADING (DEG) | | | |
|---|---|---|---|---|
| | +15° Bank | −15° Bank | +30° Bank | −30° Bank |
| 0 | 324.58 | 35.42 | 306.05 | 53.95 |
| 45 | 357.73 | 63.11 | 312.88 | 70.40 |
| 90 | 90.00 | 90.00 | 270.00 | 90.00 |
| 135 | 182.27 | 116.89 | 227.12 | 109.60 |
| 180 | 215.42 | 144.58 | 233.95 | 126.05 |
| 225 | 243.11 | 177.73 | 250.40 | 132.88 |
| 270 | 270.00 | 270.00 | 270.00 | 90.00 |

TABLE I-continued

| | INDICATED HEADING (DEG) | | | |
|---|---|---|---|---|
| Actual Hdg (°) | +15° Bank | −15° Bank | +30° Bank | −30° Bank |
| 315 | 296.89 | 2.27 | 289.60 | 47.12 |

Table II which in turn, is derived from Table I indicates the magnitude and sign of the heading errors in degrees (°) for various headings and for the various bank angles.

TABLE II

| | INDICATED HEADING (Deg.) | | | |
|---|---|---|---|---|
| Actual Hdg (°) | +15° Bank | −15° Bank | +30° Bank | −30° Bank |
| 0 | −35.42 | 35.42 | −53.95 | 53.95 |
| 45 | −47.27 | 18.11 | −92.12 | 25.40 |
| 90 | 0.00 | 0.00 | +180.00 | 0.00 |
| 135 | 47.27 | −18.11 | 92.12 | −25.40 |
| 180 | 35.42 | −35.42 | 53.95 | −53.95 |
| 225 | 18.11 | −47.27 | 25.40 | −92.12 |
| 270 | 0.00 | 0.00 | 0.00 | +180.00 |
| 315 | −18.11 | 47.27 | −25.40 | 92.12 |

As may be seen from Table I, for a right wing down turn in which the bank angle exceeds the complement of the dip angle (i.e., $\phi = +30°$) the compass transmitter heading indications are limited to the range 227°-312°. Thus, for any actual heading 0°-360°, the indicated headings are roughly accurate (though still in error) over a limited range extending generally between South-West (225°) and North-West (315°). Similarly, for a left wing down turn (with a bank angle $\phi = -30°$) the compass transmitter indications are limited to the range 47°-132°, i.e., a range extending generally between North-East (45°) and South-East (135°). Thus, it can be seen that vertical field error introduces serious ambiguities and anomalies on all indicated headings during turns when bank angle equals or exceeds the complement of the dip angle.

Tables I and II illustrate heading ambiguities and anomalies for the particular dip and bank angles described, i.e., Q = ±30 and D = +70°. Obviously, for different combinations of dip and bank angles the indicated headings and heading errors will vary. However, "Northerly Turning Error" ambiguities and anomalies of the sort just described exist to varying degrees whenever the bank angle equals or exceeds the complement of the dip angle. As pointed out previously, "Northerly Turning Error" can also result in continuous oscillation about a desired heading when attempting to straighten out on a Northerly heading even though the bank angle is less than the complement of the dip angle. The nature of this oscillatory "Northerly Turning Error" can also be illustrated by reference to Table I. For bank angles of ± 15°, let it be assumed that the system is being operated in the compass mode, i.e., not slaved to a directional gyro. For a +15° bank, i.e. a right wing down turn from a westerly heading towards North, the craft must turn approximately to a 45° actual heading for the compass to have an indicated heading of approximately 0° (i.e., 357.73°). Upon levelling out, however, the compass indicates the actual heading which, as pointed out, is 45° to the East of magnetic North. This informs the pilot that a left bank turn is needed to obtain a North heading. During a subsequent −15° bank, the aircraft turns to an actual heading of approximately 315° because at that heading, the indicated heading for a −15° bank is approximately 0° (i.e., 2.27°). Upon levelling out, the now correct indication of 315° will inform the pilot that he is not to the west of magnetic North and that a right bank turn is needed to obtain a North heading. Thus, an oscillatory condition is established which makes it very difficult to turn to and level out on a North heading or a more northerly heading.

Thus, it can be seen that magnetic compass systems and systems in which the directonal gyro is slaved to a magnetic compass system are subject to errors induced by the vertical component of the Earth's magnetic field due to acceleration errors in turns, errors which are customarily called "Northerly Turning Errors." The term "Northerly Turning Error" is somewhat of a misnomer in that the problem exits with a Sough Heading when in the Southern Hemisphere. A more accurate description of a phenomenon would be "Hemispherical Turning Error." However, it is commonly referred to as "Northerly Turning Error" and when thus referred to in the context of this specification, it will be understood that it is not limited to the Northern Hemisphere but is simply a turning error for a pendulous induction compass transmitter due to the vertical component of the Earth's field during turns.

The oscillatory condition which exists as the pilot tries to turn to a northerly heading in the Northern Hemisphere is not present when turning to a southerly heading in the Northern Hemisphere. That is, the data from Table I makes it clear that this oscillatory or overshoot instability does not exist since for a Southerly heading the compass indicated heading will show 180° before that heading is actually reached. That is, while trying to turn to a southerly heading in the Northern Hemisphere, the error introduced by the vertical component of the Earth's field causes an undershoot rather than an overshoot. As a result, although the flux valve gives erroneous indications which introduce some difficulties, the fact that the error results in undershoot allows the pilot, by continuing to bank, to reach the southerly heading in the Northern Hemisphere.

This oscillatory condition is not present when turning to a southerly heading in the Northern Hemisphere. That is Table I clearly shows that this oscillatory or overshoot instability does not occur for a southerly heading since the indicated heading will show 180° before that heading is actually reached. That is, the error introduced by the Earth's vertical field causes an undershoot rather than an overshoot. As a result, although the compass transmitter provides erroneous indications, the fact that the erroneous indications cause undershoot allows the pilot, by continuing to bank to reach the southerly heading.

As has been shown previously in Equation (8), the vertical field error along the athwartships axis during a turn is $V \sin \phi$. As a result, the indicated heading which is represented by the arc tangent of the athwartships component $A_{100}$ divided by the fore/aft component $F_\phi$ has an error term which varies with latitude so that substantial errors in indicated heading, as shown in Table I and II may be introduced and result in "Northerly Turning Error." Applicant has found that the vertical field error can be substantially eliminated by generating a compensating signal in the form of a varying DC signal which when added to the sensed signal from the transmitter cancels the vertical field error.

The Earth's vertical field is defined as $V = M \sin D$, where M is the Earth's magnetic field and D is the dip angle. The vertical field error $V \sin \phi$ thus may be defined as:

$$V \sin \phi = M \sin D \sin \phi \quad (21)$$

Thus, by adding a signal equal to $M \sin D \phi$ to the athwartships component, $A_{100}$, $A_{100}$ is modified to become $A_{\phi C}$, i.e., the compensated athwartships component $$A_{\phi C} = \sin \psi \cos \phi - V \sin \phi + M \sin D \sin \phi \quad (22)$$

$$A_{\phi C} = H \sin \psi \cos \phi \quad (23)$$

As a result, in Equation (13) the tangent of $\psi_\phi$ becomes:

$$\mathrm{Tan}_{\phi C} = H \mathrm{Tan}\, \psi \cos \phi \quad (24)$$

It can be seen from Equation (24) that the indicated heading now only contains a two cycle error proportional to $\cos \phi$ which is relatively small and does not vary with latitude. As a result, there is no error due to the Earth's vertical field component and "Northerly Turning Error" is eliminated.

Although two cycle error is relatively small since it does not vary with latitudes, there may be occasion when there is a need to eliminate even this relatively minor source of heading errors. This may readily be achieved by processing the corrected athwartships component $A_{\phi C}$ so that the error indicing $\cos \phi$ factor is eliminated. By multiplying the corrected signal $A_{\phi C}$ by a $(1/\cos\phi) \phi$ is modified to become $A_{\phi CC}$ $$A_{\phi CC} = H \sin \psi \cos \phi (1/\cos\phi) \quad (25)$$

$$A_{\phi CC} = H \sin \psi \quad (26)$$

As a result, the tangent of $\psi_{\phi C}$ as defined by Equation (2) becomes $$\mathrm{Tan}\, \psi_{\phi CC} = \mathrm{Tan}\, \psi \quad (27)$$

As will be discussed in detail later, cancellation of the two cycle error term $\cos \phi$ can be most readily achieved in the negative feedback path of a null balance remodulation network by multiplying the negative feedback signal by $\cos \phi$.

Figure 3:
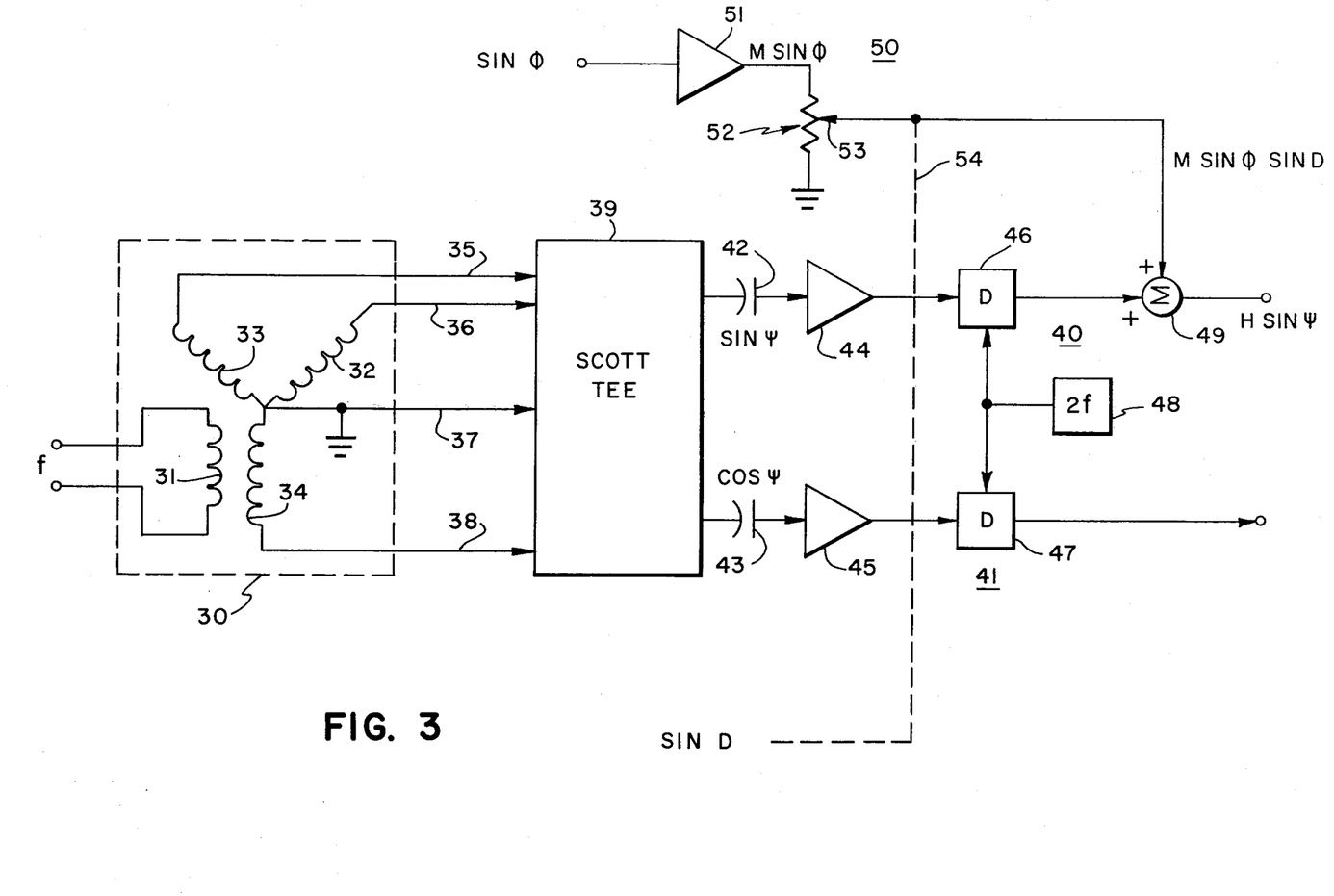
FIG. 3 is a schematic illustration of an arrangement for compensating a pendulous induction compass transmitter of the synchro type by processing an output signal from the transmitter in an external signal processing channel.

FIG. 3 illustrates one embodiment of a compensated pendulous induction compoass transmitter of the synchro type. In the system of FIG. 3, a DC compensating signal proportional to $M \sin \phi \sin D$ is generated and combined with the demodulated output signal from the compass transmitter by summing the two DC signals in such a fashion that the error component $V \sin \phi$ in the demodulated output signal is cancelled in the $\sin \phi$ channel signal processing network, i.e., the channel in which the output from transmitter windings which sense the athwartships field component is processed. $\sin \phi$ can easily be supplied from the aircraft vertical roll gyro and a signal proportional to $\sin D$ may be readily be set manually in a potentiometer or automatically programmed as a function of latitude and longitude. The apparatus illustrated in FIG. 3 can be easily adapted to an existing compass system that uses a synchro type output from the compass transmitter and thus may be utilized without affecting impedance matching between the transmitter and slaving system.

Thus, in FIG. 3, a pendulous induction compass transmitter is illustrated schematically at 30. Transmitter 30 includes an excitation winding 31 having a sinusoidal excitation voltage (commonly at 400 Hz) applied thereto to saturate a magnetic core structure thereby to saturate twice during each excitation voltage cycle. A plurality of sensing windings are wound in the core. Saturation of the core twice per excitation voltage cycle causes the Earth's field to induce second harmonic carrier suppressed, double sideband signals in these windings which are proportional to the Earth's field along the axes on which the windings are mounted. Windings 32, 33 and 34 are connected in a Y or synchro configuration. Windings 32 and 33 sense the athwartships component A of the Earth's horizontal magnetic field and winding 34 senses the fore/aft component F. The second harmonic, double sideband, carrier suppressed output signals from the compass transmitter 30 are supplied via leads 35, 36, 37 and 38 to a Scott-Tee transformer shown at 39. The Scott-Tee has a Y wound synchro type primary, not shown, to which the three phase signals from the induction compass transmitter are coupled. The secondary of the Scott-Tee transformer, also not shown has a pair of orthogonally wound windings so that three-phase output signal from synchro type induction compass transmitter 30 is converted in the Scott-Tee transformer to a pair of output signals which are respectively representative of the sine and cosine functions of the heading angle and Earth's magnetic field H, i.e., the fore/aft, F, and athwartships A, components of the field as sensed by the induction compass transmitter. Scott-Tee transformers are well-known devices for transforming either a two-phase input to a three-phase output or, conversely, a three-phase input to a phase two output as is the case in FIG. 3. Reference is hereby made to the Textbook "Alternating Current Machinery" by L. V. Bewley, MacMillan Company, N.E. 1949, and particularly pages 89 through 91 thereof which describe the basic characteristics of the so-called Scott-Tee connection.

The outputs from Scott-Tee transformer 39 are signals representative of the sine and cosine of the heading angle $\psi$ and therefore represent the Earth's horizontal field sensed along the athwartships axis and the fore/aft axes of the aircraft respectively. The athwartships or sin $\psi$ output from the induction compass transmitter (i.e., $\sim H \sin\psi$) is applied to a sin $\psi$ signal processing channel 40 whereas the fore/aft or cos $\psi$ output from the transmitter (i.e., $\sim H \cos\psi$) is applied to a cos $\psi$ signal processing channel shown generally at 41. The two signals are processed in the respective channels to produce demodulated, DC signals which are representative, respectively, of the Earth's field component sensed along these axes. The athwartships signal includes two cycle errors as well as vertical field errors during aircraft turns when the pendulously mounted induction compass transmitter is tilted to the bank or roll angle $\phi$ thereby producing sensing errors in the windings of the induction compass transmitter.

The fore/aft sensed signal which is proportional to the cosine of the heading angle $\psi$ does not, as shown in Equation 10, have any vertical field induced errors in a pendulously supported induction compass transmitter nor is it subject to two cycle error. It is only the athwartships component of the Earth's field sensed by the induction compass transmitter whih is subject to vertical field and two cycle errors during turns. Thus, only the athwartships component of the signal sensed by the induction compass transmitter needs to be compensated to eliminate vertical field errors.

The second harmonic, double sideband, carrier suppressed signals at the output of Scott-Tee 39 are applied through coupling capacitors 42 and 43 to amplifiers 44 and 45 in the respective signal processing networks. The amplified second harmonic signals are applied as one input to synchronous demodulators 46 and 47. A second harmonic carrier signal from reference carrier signal source 48 is applied as the other input to demodulators 46 and 47. That is, if the excitation voltage for induction compass transmitter 30 is a 400 Hz alternating voltage, then the output signals are second harmonics of the excitation frequency (or 800 Hz). By reinserting a carrier signal of twice the frequency, (i.e., 800 Hz), demodulators 46 and 47 demodulate the signals to produce DC outputs which represent the variations of the Earth's magnetic field as sensed by the windings of the induction compass transmitter along the athwartships and fore/aft axes respectively.

The output from demodulator 46 in sin $\psi$ channel 40 which represents the horizontal component of the Earth's field sensed along the athwartships axis of the craft is processed to compensate for the errors introduced by the Earth's vertical field during turns. The output, from demodulator 46, is therefore applied to assuming node 49 in which the demodulated sin $\psi$ signal from the induction compass transmitter is combined by summing it with the compensating signal from vertical field compensation network shown generally at 50 which generates the compensating signal which cancels the effects of the vertical component of the Earth's magnetic field due to tilting of the compass transmitter during aircraft tursn. Compensating network 50 generates a signal proportional to Msin D sin $\phi$ and couples this signal to the other input of summing node 49 to add the compensating signal to the demodulated DC signal from the induction compass transmitter.

One input to network 50 is a varying DC input voltage from the vertical roll gyroscope which is proportional to the sine of the turn or roll bank angle $\phi$ and hence represents the bank or tilt of the compass transmitter during a turn. The signal from the roll gyroscope is applied to an operational amplifier 51 which not only amplifies the signal but introduces a scale factor for the Earth's field M. The amplified M sin $\phi$ signal is applied as a DC supply voltage for potentiometer 52 which has a movable wiper 53 manually controlled by shaft 54. The position of the wiper is set by shaft 54 in such a manner as to insert a sin D term. The voltage at wiper 53 is therefore proportional to the product of the sine of the bank angle $\phi$ the Earth's magnetic field M and the sine of the dip angle $\phi$ (i.e., $V_{53} = M \sin D \sin \phi$).

Potentiometer wiper 53 may be set manually or alternatively, sin D may be automatically programmed as a function of the latitude and longitude. If manual setting is used and if the aircraft or vehicle is to traverse a relatively small distance in latitude so that the dip angle remains relatively constant, the output of the potentiometer may be adjusted initially to position the wiper so that the output exactly cancels the vertical field error for any given bank angle and no further adjustment is required. Where the aircraft is likely to fly over a large distance so that the dip angle D changes substantially, changes in the wiper position by the pilot will be necessary to maintain proper compensation. Potentiometer 52 may be a linear potentiometer which has sinusoidal scale calibration so that the wiper is adjusted to achieve the required sin D adjustment. Alternatively, a sinusoidally wound potentiometer with a linear scale may be utilized instead.

The output from potentiometer wiper 53 which is M sin D sin $\phi$ is applied directly as the other input to the summing node 49. The signal M sin D sin $\phi$ which is equal to Vsin $\phi$ or the earth component due to the vertical component of the Earth's field is thus added algebraically to the demodulated DC signal from the induction compass transmitter and cancels the error due to the vertical component of the Earth's field. The output from summing node 49 is therefore H sin $\psi$ cos $\phi$ and thus contains only two cycle error due to the bank or tilt angle $\phi$. This corrected signal may be applied to the heading indicator system directly or may be remodulated, for utilization in any suitable manner in a heading, indicating or control system.

As pointed out previously, two cycle errors which remain after this compensation tend to be relatively small and do not have the major effects that vertical field errors do. It will be apparent therefore that the overall errors produced in the output of the pendulously stabilized induction compass transmitter are reduced substantially and the "Northerly Turning Error" instabilities such as oscillation about the North heading and others previously mentioned are avoided.

In the compensated pendulous induction compass transmitter system shown in FIG. 3, the compass transmitter windings are shown as connected in a Y or synchro configuration which requires transformation through a Scott-Tee transformer or the like to produce the H sin$\psi$ and H cos$\psi$ signals which are then demodulated and, in the case of the sin $\psi$ signal, compensated. While the synchro type of connection for induction compass transmitters is quite common so that the compensation arrangement illustrated in FIG. 3 is very useful and has great applicability to existing systems, the instant invention is not limited thereto since it is equally applicable to induction compass transmitters other than those of the synchro or Y configuration.

Figure 4:
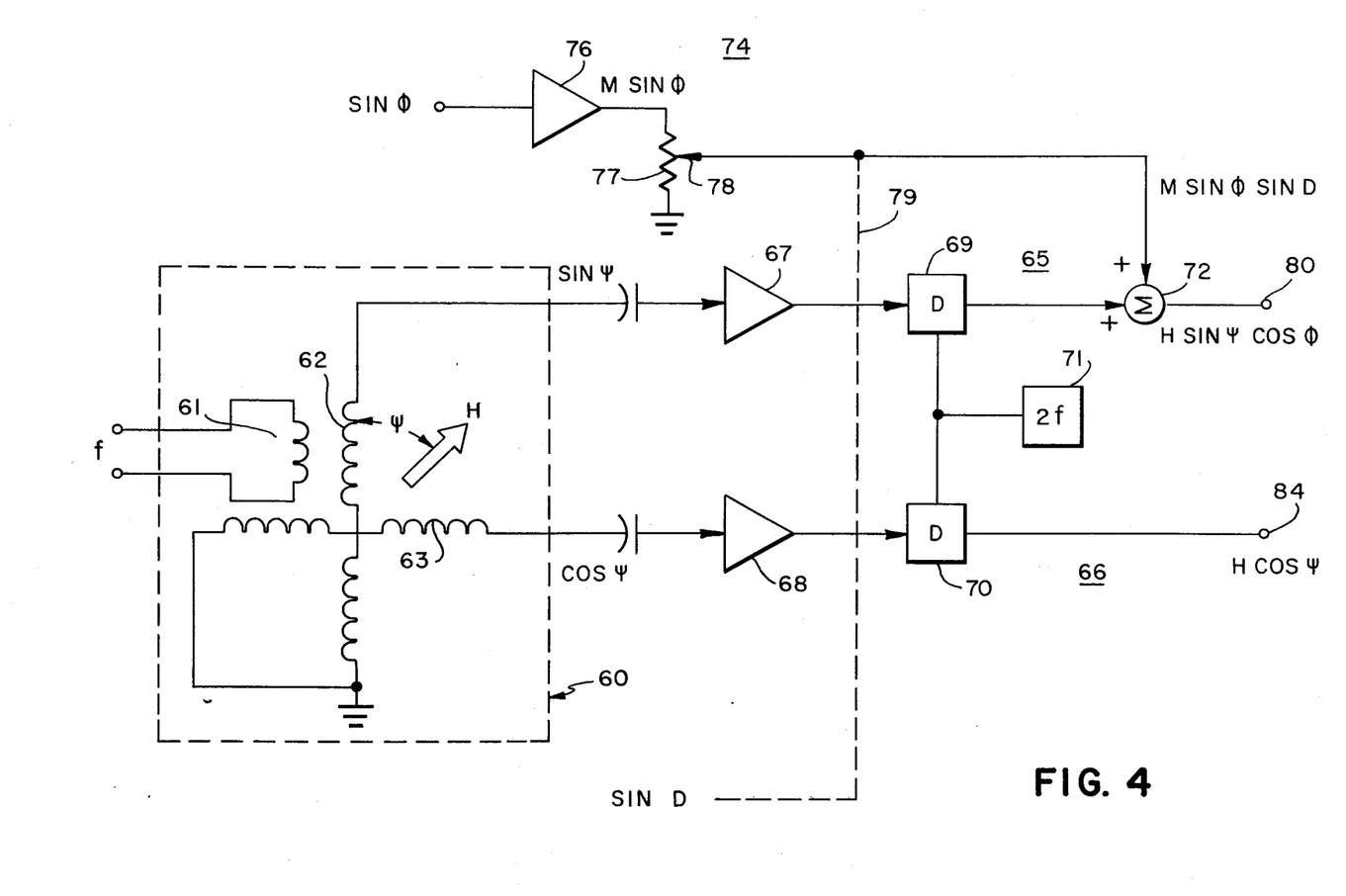
FIG. 4 illustrates an arrangement in which the demodulated output from a resolver type of induction transmitter is compensated in external signal processing channels.

FIG. 4 illustrates an arrangement in which an induction compass transmitter having a typical resolver winding configuration is compensated in accordance with the instant invention. In such an instance, the output signals from induction compass transmitter may be demodulated directly without any transformation in a Scott-Tee transformer or the like since the output from the windings of a resolver type of induction compass transmitter are the athwartships and fore/aft sensed components of the Earth's field, i.e., the H sin$\psi$ and H cos $\psi$ signals. Thus, in FIG. 4, a pendulously supported induction compass transmitter of the resolver type is illustrated schematically at 60. Compass transmitter 60 includes an excitation winding 61 having an alternating excitation voltage (commonly at 400 Hz) applied thereto to saturate a magnetic core structure which has a plurality of magnetometer sensing windings 62 and 63 thereon. The excitation voltage saturates the core twice during each excitation voltage cycle so that the Earth's field induces second harmonic double sideband, suppressed carrier signals proportional to the fore/aft and athwartships components of the Earth's field in these windings. Windings 62 and 63 are, as pointed out before, connected in a typical resolver configuration with windings 62 shown as sensing the fore/aft component F of the Earth's horizontal magnetic field H and winding 63 sensing the athwartships component A. The output from winding 63 is therefore proportional to the product of the horizontal component H of the Earth's magnetic field and the sine of the heading angle $\psi$ (i.e., $-H \sin \psi$) while the output from winding 63 is proportional to the horizontal component H of the Earth's magnetic field and the cosine of the heading angle $\psi$ (i.e., $H \cos\psi$). The output from windings 62 and 63 are applied respectively to the sine and cosine signal processing networks 65 and 66 in which the signals are demodulated. The H $\sin\psi$ signal, in processing network 65 is also compensated to cancel the effects of the vertical component of the Earth's magnetic field during turns.

The second harmonic signals representing the fore-/aft and athwartships components of the Earth's magnetic field are applied through suitable coupling capacitors to amplifiers 67 and 68. The amplified signals are applied as one input to synchronous demodulators 69 and 70 in channels 65 and 66. The other input to demodulators 69 and 70 is a second harmonic reference carrier signal from reference carrier signal souce 71. By reinserting a carrier signal of twice the excitation frequency, demodulators 69 and 70 demodulate the second harmonic carrier suppressed, double sideband signal to produce a varying DC output which represents the variations of the Earth's magnetic field as sensed by the windings of the compass transmitter.

The local second harmonic carrier signal in FIG. 4 as well as in FIG. 3 is shown as being supplied from a separate source of carrier signals 71. It will be obvious, however, that the second harmonic carrier signal applied to the demodulators may be obtained directly from the carrier excitation voltage source by multiplying the signal to produce a second harmonic signal which is in phase with the excitation frequency.

The demodulated output signals from demodulators 70 which is a DC signal proportional to the sensed fore/aft component, it applied to an output terminal 84 for application directly to the heading indicator or control system since, as pointed out previously, the fore/aft component of the Earth's magnetic field in a pendulously mounted induction compass transmitter is not affected by the vertical component of the Earth's field nor is it subject to two cycle error during turns. The output from demodulator 69 in network 65, on the other hand, contains an error component due to the vertical component of the Earth's magnetic field which is equal to $-V \sin \phi$. The output from demodulator 69 is therefore applied to a summing node 72, other input to which is a compensating signal proportional to $M \sin D \sin \phi$ from a vertical field compensation network shown generally at 74. Network 74 generates a compensation signal which will be used to cancel errors due to the vertical component of the Earth's magnetic field due to tilting of the compass transmitter during turns.

Compensating network 74, generates a compensation signal which is used to cancel the error component in the signal due to the Earth's vertical field component when the compass transmitter is tilted during turns. One input to network 74 is a varying DC input voltage from the vertical roll gyroscope which is proportional to the sine of the roll or bank angle $\phi$ and hence represents the bank angle or tilt of the compass transmitter. The signal from the roll gyro is applied to an amplifier 76 which amplifies the signal and introduces a scale factor equal to the Earth's magnetic field M so that the output from amplifier 76 is thus a signal proportional to $M \sin \phi$. This signal $M \sin \phi$ is applied as the DC supply voltage to a potentiometer 77. Potentiometer 77 has a movable wiper 78 which is manually controlled by a shaft 79 to set the position of the wiper so as to insert a sin D term.

The voltage at wiper 78 is therefore proportional to the product of the sine of the bank angle $\phi$, the Earth's magnetic field M and the sine of the dip angle D (i.e., $V_{78} = M \sin D \sin \phi$). As pointed out previously, in connection with the description of FIG. 3, potentiometer wiper 78 may be set manually or alternatively, sin D may be automatically programmed as a function of the latitude and longitude. Again, if manual positioning is used and if the aircraft or vehicle is to traverse a relatively small distance in latitude, so that the dip angle stays relatively constant, the output of potentiometer 77 may be adjusted initially simply by moving wiper 78 so that for any given bank angle, the output exactly cancels the vertical field error and no further adjustment is required. Where the aircraft is likely to fly over large distance so that the dip angle changes substantially, changes in the wiper position by the prior art may be necessary to maintain proper compensation. Potentiometer 77 may be a linear potentiometer which has sinusoidal scale calibrations so that the wiper is adjusted to achieve the required sin D adjustment. Alternately, a sinusoidally wound potentiometer with a linear scale may be utilized instead.

The output from potentiometer wiper 78, which is $M \sin D \sin \phi$ is applied directly or through an amplifier if desired, as the other input to summing node 72 to cancel the error component in the demodulated output from the sine channel due to the vertical component of the Earth's field. The compensated output signal from summing node 72 is then applied to an output terminal 80 so that the $H \sin \psi$ field sensed by the compass transmitter may be remodulated or otherwise processed for use in a heading indicator, or control system.

In the arrangements illustrated in FIGS. 3 and 4, the output signal from the induction compass transmitter is compensated to eliminate the effects of the Earth's vertical field component on the athwartships axes sensing windings during turns. However, as was pointed out previously, the signal still contains two cycle error proportional to $\cos \phi$ so that the compensated signal at output terminal 80 is $H \sin \psi \cos \phi$. That is $H \sin \psi$ which is the component sensed along the athwartships sensing windings is reduced by $\cos \phi$ which is proportional to the bank or tilt angle. In most instances, this error factor is extremely small as compared to those errors due to the Earth's vertical field component since the latter varies with the sine of the dip angle and in many instances this error is small enough to be acceptable. However, in some arrangements, it may be desirable to compensate the output signal from the induction compass transmitter to eliminate even the two cycle error, small though it may be.

Figure 5:
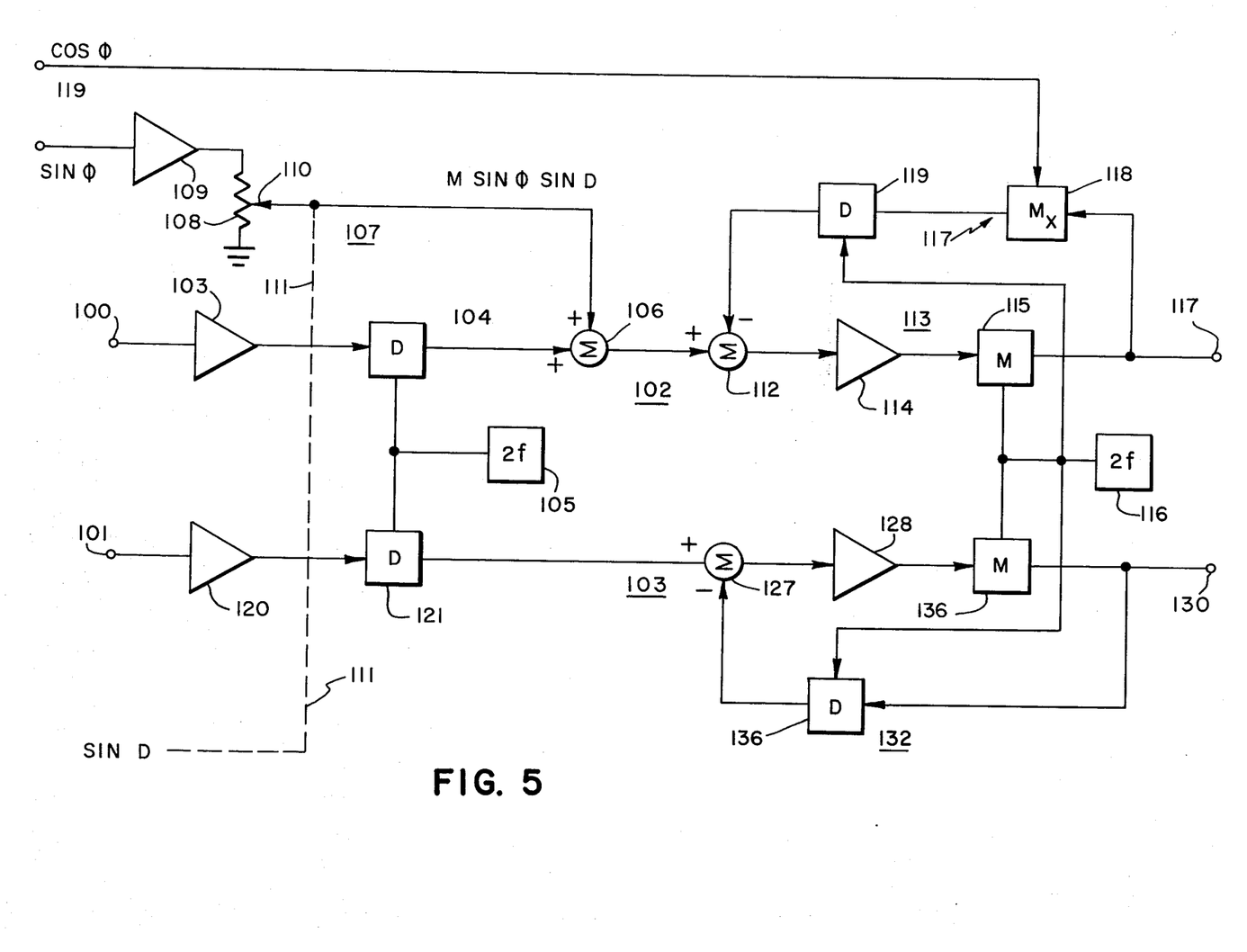
FIG. 5 is another alternative embodiment in which compensation for two cycle error is also achieved in the external signal processing channel.

FIG. 5 illustrates an arrangement in which the signal from the windings which sense the athwarthships component of the Earth's field is initially compensated to eliminate the error due to the Earth's vertical field during a turn and is thereafter further compensated to eliminate the two cycle error and produce an output signal which is a true indication of the Earth's horizontal field along the athwartships axis.

This is achieved in FIG. 5 by remodulating the compensated $H \sin \psi \cos \phi$ signal in a closed loop modulating circuit. The remodulated signal is fed back in a negative feedback loop wherein the signal is demodulated and multiplied by a DC signal proportional to $\cos \phi$. This reduces the negative feedback in the loop by the factor $\cos \phi$. This increases the forward gain by the same factor and thus cancels the two cycle error component cos φ. This twice corrected compensated signal is then fed back to the input of the remodulation channel to be summed with the incoming demodulated signal. As a result, the closed loop circuit is driven until the output of the loop is a modulated signal which is proportional to the H sin of ψ alone, with the two cycle error then represented by cos φ having been eliminated.

In FIG. 5, the second harmonic, double sideband, carrier suppressed signals representing the Earth's magnetic field as sensed along the fore/aft and athwartships axis of the vehicle by the induction compass transmitter, i.e., the H sin ψ and H cos ψ signals are obtained in the manner shown either in FIGS. 3 or 4, i.e., either by converting three phase synchro signals through a Scott-Tee transformer or by using an induction compass transmitter with windings having a resolver configuration. The two second harmonic signals are applied to input terminals 100 and 101 of signal processing networks 102 and 103 to compensate both for the effect of the Earth's vertical field during a turn and also for two cycle error. The signal representing the sine of the heading angle ψ i.e., the Earth's field as sensed by the transmitter windings along the athwartships axis of the aircraft are applied to input terminal 100 and the H sin ψ signal is first demodulated then processed to compensate for errors due to the Earth's vertical field during turns and thereafter, applied to a remodulating network in which the signal is both remodulated and, through negative feedback loop in the remodulating network, is further processed by multiplying the negative feedback signal by cos φ to cancel two cycle error. The signal from the compass transmitter which is a measure of the fore/aft components of the Earth's field, i.e., H cos ψ component, is applied to input terminal 101. Since the fore/aft component is not affected by the Earth's vertical field during turns, this signal is not in any way processed to compensate the heading errors and it is simply demodulated and then remodulated to be applied either to the heating indicator or utilized to perform other control functions as may be required. Hence, in FIG. 5, only the sin ψ channel is described.

The second harmonic signal at terminal 100 is applied after amplification as one input to a demodulator 104. A reference carrier signal from source 105 which is the second harmonic of the excitation voltage, is applied as the other input to demodulator 104. The signal from source 105 is also applied to a demodulator 121 in network 103 in which the fore/aft signal from the induction compass transmitter is processed. The output of demodulator 104 and 91 are varying DC voltages which are proportional to the horizontal components of the Earth's field as sensed along the athwartships and fore-/aft axes of the craft. The output from demodulator 104, as pointed out previously, is proportional to H sin ψ cos φ − V sin φ. This latter term, − V sin φ, of course, represents the error introduced by the vertical component of the Earth's field during turns. This term, as shown in Equations 1-24, is related to the dip angle D and varies widely with latitude causing instabilities such as "Northerly Turning Error." The demodulated DC signal, including the vertical field error from the demodulator 104 is applied as one input to a summing node 106 and is summed with a compensating signal from a vertical field compensation network shown generally at 107. The compensating network, which is the same as those shown in FIGS. 3 and 4, generates a DC signal proportional to M sin D sin φ which is equal to the vertical field error V sin φ. Vertical compensating network 107 includes a potentiometer 108 which has a voltage supplied thereto from amplifier 109 which is proportional to M sin φ. The input to amplifier 109 is a signal from the vertical roll gyroscope which is proportional to the sine of the bank or tilt angle, i.e., sin φ. Amplifier 109 not only amplifies the sin φ signal but introduces a scale proportional to the magnitude of the Earth's field M so that the output from the amplifier is M sin φ. This amplified signal is applied as the DC supply voltage to potentiometer 108 which has a movable wiper 110 that is controlled through a shaft 111. The shaft is used to set the position of the wiper so as to insert a sin D term. The voltage at wiper 110, which is applied as the other input to summing node 106 is therefore proportional to the product of the sine of the bank angle φ, the Earth's magnetic field M and the sine of the dip angle D (i.e., $V_{96} = M \sin D \sin \phi$). The output signal from summing node 106 is therefore a signal which has been compensated for vertical field errors. The output at summing node 106 is therefore a DC signal proportional to H sin ψ cos φ. In other words, the output from summing node 106 is a signal proportional to the Earth's magnetic field sensed along the athwartships axis of the aircraft but which has a two cycle error component proportional to cos φ. The output signal from summing node 106, wich now includes only two cycle error, is applied to a summing node 112 at the input of a closed loop remodulating network 113 in which the signal is remodulated and the two cycle error due to cos φ is eliminated. Remodulation network 113 consists of a modulation path in which the varying output signal from summing node 112, the DC voltage proportional to H sin ψ cos φ, is remodulated. The signal is applied to amplifier 113. The amplified output is applied to modulator 115 the other input of which is from a reference carrier source 116 which may be of the same frequency as the original second harmonic signal. The output from modulator 115 may thus be a double sideband, carrier suppressed, second harmonic signal proportional to H sin ψ cos φ. This remodulated signal is applied to output terminal 117 and may be coupled to various instrumentalities to perform either an indicating or a control function.

The modulated output from modulator 115 is also coupled to a negative feedback path in which the second harmonic, modulated signal is corrected to compensate for cos φ to eliminate two cycle error. The modulated output signal from modulator 115 is applied as one input to a multiplier 118. The other input to multiplier 118 is a DC signal proportional to the cos of φ which is applied to input terminal 119 from the roll gyroscope. The output from multiplier 118 is therefore a negative feedback signal which is reduced in magnitude since cos φ < 1. By reducing the negative feedback, the gain of the loop is increased proportionately thereby cancelling the cos φ term in the output.

The output from multiplier 118 is applied as one input to synchronous demodulator 119 in the negative feedback path. The other input to demodulator 119 is a second harmonic carrier signal from carrier signal source 116. The carrier signal is reinserted to demodulate the compensated, second harmonic, double sideband, carrier suppressed signal from multiplier 118 to produce a varying DC signal at the output of demodulator 119 which is proportional to H sin ψ. This two cycle error compensated signal is the other input to summing node 117. With the system at null balance the output 112. modulator 115 in modulating path 113 is a second harmonic, double sideband carrier suppressed signal proportional to H sin ψ. As a result, the signal at output terminal 117 represents the Earth's Field as sensed by the transmitter athwartships windings during turns with errors due to the Earth's vertical field and two cycle errors eliminated.

In any closed loop network with negative feedback, the transfer function, i.e., (output/input) (C/R) is a function of the gain G and the negative feedback H. Thus $$\frac{C}{R} = \frac{G}{1 + GH}.$$

If G >>> 1, which is the case if amplifier gain is large, then GH >>> 1 and the transfer function $$\frac{C}{R} = \frac{1}{H} \text{ (i.e., } \frac{C}{R} = \frac{G-1}{GHH} \text{)}.$$

If the negative feedback H is reduced by the factor cos φ, where cos φ>1, a condition which pertains if the plane is not in level flight since only in level flight does φ = 0 and cos φ = 1. For any angle of tilt about the roll axis where φ>0°, the cos φ<-. Since the transfer function is inversely proportional to negative feedback H and H is reduced by multiplying it by cos φ which is less than 1, then it is obvious that as a result the output is correspondingly increased by a cos φ factor and the two cycle error component cos φ, is cancelled.

From the foregoing description, it can be seen that vertical field induced errors during turns as well as two cycle errors have been eliminated. However, errors which occur during linear acceleration due to the tilt of the pendulous compass transmitter about the aircraft pitch axis are not compensated and are still present. For most aircraft, however, large tilt angles due to linear acceleration are of relatively short duration. The problem, therefore, is less severe than that occurring during turns. In some instances, compass slaving may be interrupted during acceleration by sensing linear acceleration and disconnecting slaving of the directional gyro from the compass whenever the linear acceleration exceeds a predetermined amount. In those systems where the compass is not slaved to a directional gyro, as is possible with the highly accurate compass indicator of the instant invention, the errors due to acceleration are still not very severe because as pointed out above, that large tilt angles during linear acceleration are of relatively short duration.

In the arrangement illustrated in FIGS. 3, 4 and 5, exact compensation signals for vertical field errors are generated by obtaining a signal proportional to sin φ from the vertical roll gyro which forms part of an aircraft heading system. For some applications, however, compensation will be sufficiently accurate if a linear function of the bank angle φ is used in place of its trigonometric function. This approximation becomes quite accurate as bank angle becomes small which automatically occurs when the aircraft is levelling out on a desired heading. Hence, it will be understood and appreciated that the instant invention is not limited to an arrangement in which compensation for the vertical field error is exact (i.e., M sin D sin φ) or (cos φ) but may be one in which the compensating signal is directly related to the roll angle φ rather than to a trigonometric function thereof.

It will be seen, therefore, that applicant has provided an arrangement and method for compensating induction compass transmitter in the signal processing channels associated with the transmitter to eliminate the effects of vertical field error thereby eliminating turning instabilities such as "Northerly Turning Error" and, if desired, eliminating two cycle error even though its magnitude is normally modest compared to vertical field errors.

While a number of specific embodiments of this invention have been shown and described above, it will, of course, be understood that the invention is not limited thereto since many modifications both as to the circuit arrangement and the instrumentalities employed therein may be made. It is contemplated by the appended claims to cover any such modifications which fall within the true spirit and scope of this invention.

What is claimed as new and desired to be secured, by Letters Patent of the United States is:

1. In a pendulous induction compass transmitter compensated for errors due to the Earth's vertical field during turns, the combination comprising:
   a. magnetic sensing means for producing modulated signals proportional to the strength of the Earth's field along the fore/aft and athwartships axes of an aircraft;
   b. means to demodulate the modulated signal representative of the sensed fore/aft field to produce a varying, DC, demodulated signal proportional to the sensed Earth's field along the fore/aft axis of the aircraft and thus to the cosine of the magnetic heading angle ψ and of the aircraft;
   c. means to demodulate the modulated signal representative of the sensed athwartships field to produce a varying, DC, demodulated signal proportional to the sensed Earth's field along the athwartships axis of the aircraft and thus to the sine of the magnetic heading angle ψ of the aircraft;
   d. means to compensate the demodulated signals for errors due to the Earth's vertical field during turns, including;
      1. means to generate a DC correction signal proportional to the product of the Earth's magnetic field M, the sine of the magnetic dip angle D and the sine of the bank angle φ,
      2. means to add said DC correcting signal algebraically to said demodulated DC signal proportional to the Earth's field and thus to the sine of the magnetic heading angle ψ to cancel the signal component due to the Earth's vertical field sensed along the athwartships axis during turns.

2. The pendulous induction compass transmitter according to claim 1 wherein said magnetic sensing means produces three phase output signals representative of the sensed field along the respective axes and includes means for converting the three phase output signals from said magnetic sensing means to a pair of signals representative of the product of the Earth's magnetic field and the sine and cosine of the magnetic heading angle ψ respectively.

3. The pendulous induction compass transmitter according to claim 2 wherein said means for converting includes a Scott-Tee transformer having a three phase input to which the three phase signals from the magnetic sensing means are coupled and a two phase output coupled to the said demodulating means.

4. The pendulous induction compass transmitter according to claim 1 including further means to compensate for two cycle error comprising a. first and second closed loop, null balanced modulating means each having an input and an output and the compensated demodulated DC signals coupled thereto, each of said modulating means including a negative feedback path from its output to its input,
b. demodulating means in each of said negative feedback paths,
c. means to reduce the negative feedback in one of said paths by a factor proportional to the cosine of the bank angle $\phi$ whereby the output signal of the modulator associated with the said one negative feedback path is increased correspondingly to cancel two cycle error during turns.

5. The pendulous induction compass transmitter according to claim 4 wherein said means to reduce the negative feedback in said one path includes;
 1. multiplying means in said path and,
 2. means to apply the output signal from the associated modulating means and a signal proportional to the cosine of the bank angle $\phi$ during a turn to said multiplier to reduce the feedback by the cosine of bank angle $\phi$.

* * * * *